Aug. 8, 1950     E. F. SIMS     2,518,083
BALE LOADER
Filed Feb. 14, 1946     3 Sheets-Sheet 1
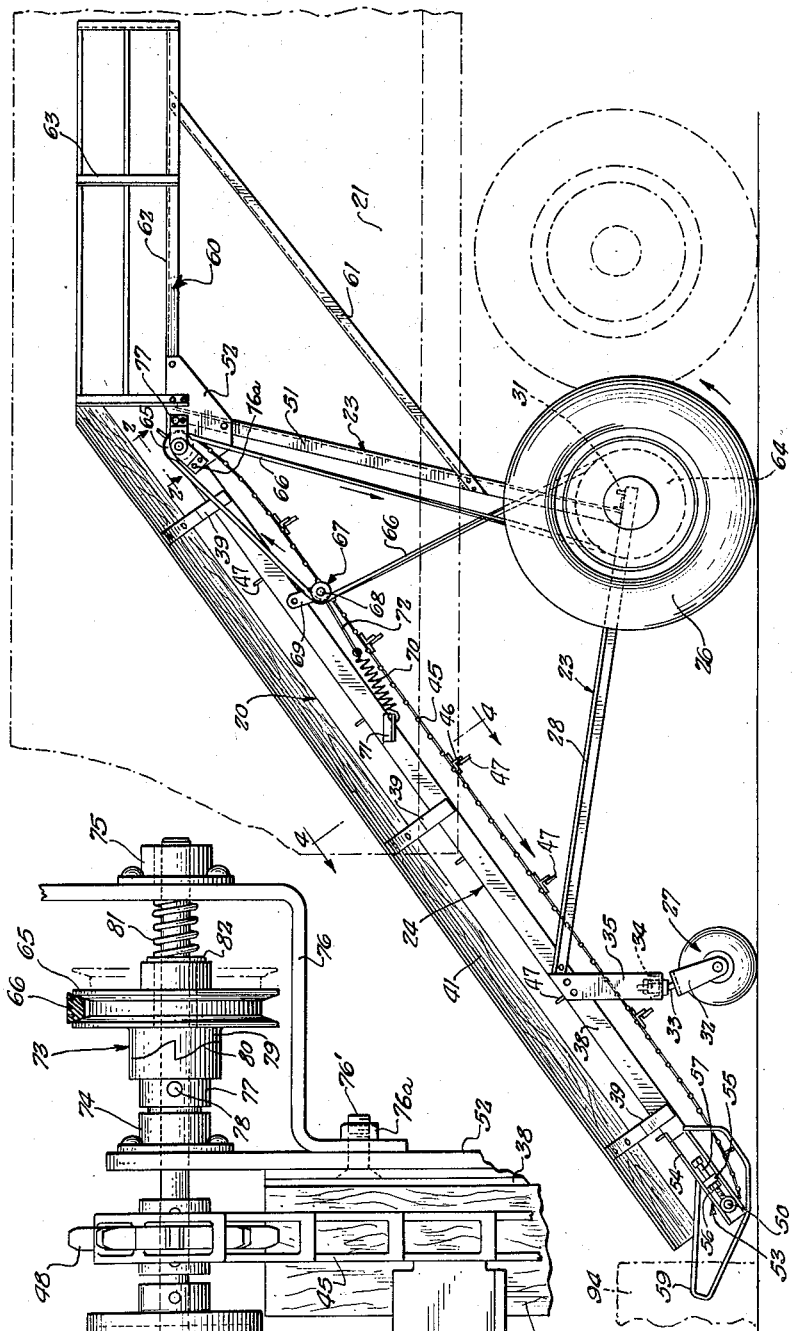
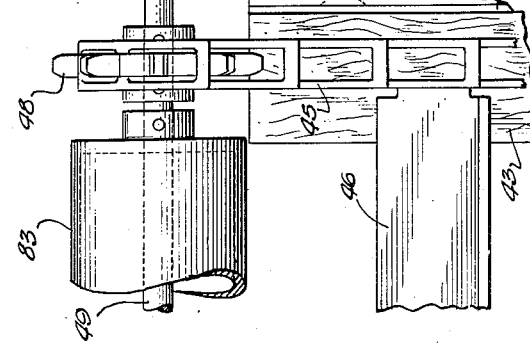
Inventor:
Edward F. Sims
By: Albert G. McCaleb
Atty.

Aug. 8, 1950   E. F. SIMS   2,518,083
BALE LOADER
Filed Feb. 14, 1946   3 Sheets-Sheet 2
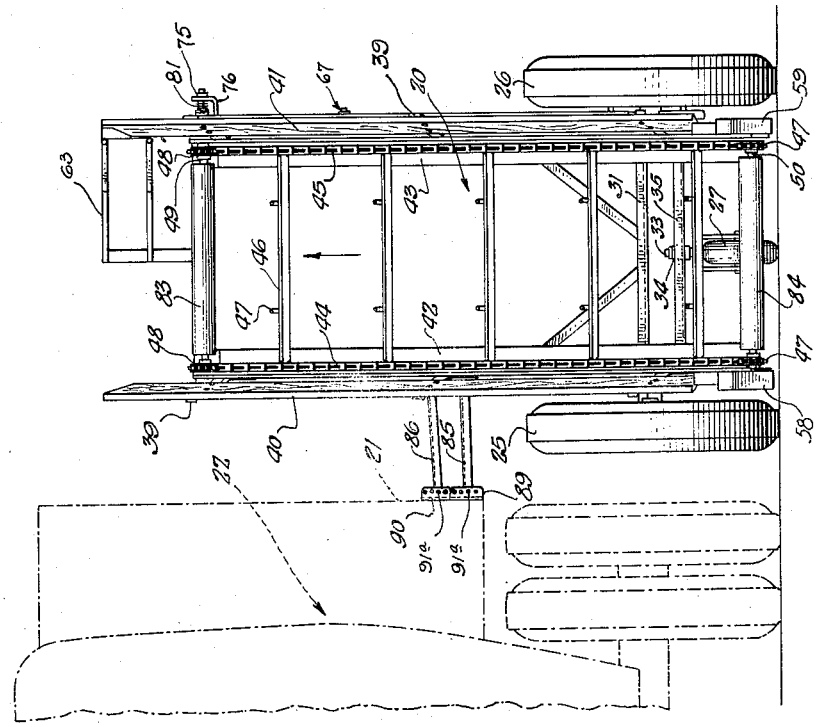
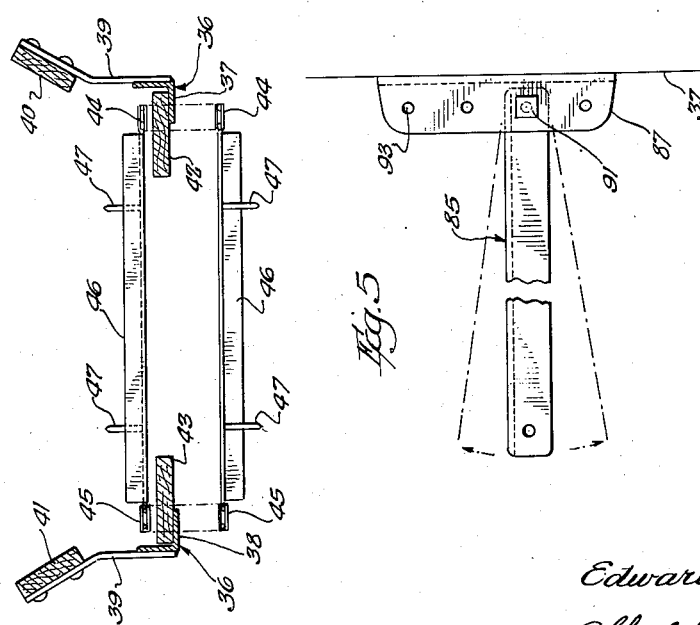
Inventor:
Edward F. Sims
By: Albert G. McColeb
Atty.

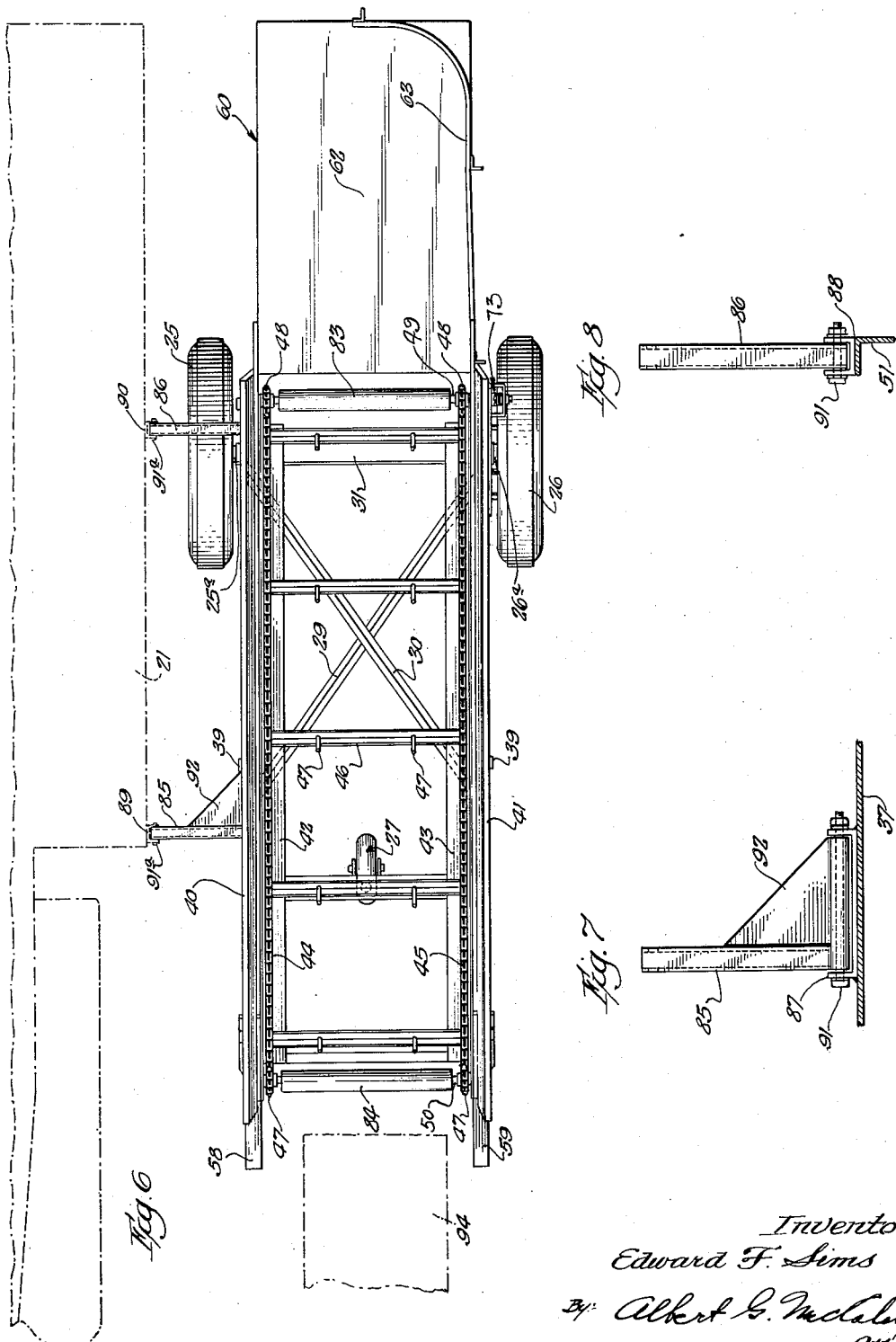

Patented Aug. 8, 1950

2,518,083

UNITED STATES PATENT OFFICE 2,518,083

BALE LOADER

Edward F. Sims, Blue Island, Ill.

Application February 14, 1946, Serial No. 647,521

2 Claims. (Cl. 198—9)

My invention contemplates and provides new and useful improvements in apparatus for elevating bales of hay or straw or other farm produce so that such bales conveniently may be transferred to a truck or wagon.

Generally speaking, the purpose of my invention is to provide a sturdy compact mechanism of simple construction which efficiently will pick up and elevate baled farm produce which is to be loaded onto a truck or wagon which it accompanies.

An object and accomplishment of my invention is to provide a bale loader which is light in weight, comparatively inexpensive, attachable to a truck or wagon, and easily controlled by the driver of the truck or wagon.

A feature of my invention is the provision, in a bale loader, of an improved elevator-conveyor mechanism comprising a roller and a plurality of sets of tines moving in a path extending closely adjacent to and partially around the roller which cooperate in a novel manner to effectuate the lifting off the ground and the elevating of bales disposed lengthwise of a path in which the loader is moving.

Another object of my invention is the provision, in a bale loader having an elevator-conveyor of the kind briefly described in the last preceding paragraph, of skids leading the aforesaid roller and a caster trailing such roller, and a non-rigid connection between the loader and its accompanying truck or wagon, which skids, caster and connection cooperate always properly to present the aforesaid tines and such roller to a bale regardless of contiguous high and low spots on or narrow ditches or trenches in the ground over which the truck and loader move as the loader approaches the bale.

Other objects, features and advantages of my invention will be apparent from the following description and accompanying drawings, in which similar characters of reference indicate similar parts throughout the several views.

In the drawings:

Fig. 1 is a side elevational view of my bale loader;

Fig. 2 is a fragmentary elevational view of the jaw clutch mechanism taken on the line 2—2 of Fig. 1;

Fig. 3 is a front elevational view of my loader;

Fig. 4 is a sectional view of the bale elevator-conveyor taken on the line 4—4 of Fig. 1;

Fig. 5 is an enlarged side view of one bar and bracket for attaching my loader to a truck or wagon;

Fig. 6 is a top plan view of my loader;

Fig. 7 is an enlarged plan view of the front bar and bracket for attaching my loader to a truck or wagon; and Fig. 8 is an enlarged plan view of the rear bar and bracket.

As generally shown in Figs. 1, 3 and 6, the loader 20 is attached to a body 21 of a conventional truck 22. The truck illustrated may be regarded as representative of various types of vehicles with which my loader advantageously may be employed in an adjunctive capacity.

Considered generally, the loader includes a main frame 23 and an elevator-conveyor mechanism 24 carried by the main frame 23. The main frame preferably is provided with a pair of laterally spaced rear wheels 25 and 26 upon which the greater portion of the weight of the main frame and elevator-conveyor mechanism is supported. Secured to the elevator-conveyor mechanism 24, intermediate the ends thereof, is a caster 27, preferably of the swivel type, to facilitate turning of the loader while being moved by the truck.

Considering the various parts of the loader in greater detail, the main frame 23 desirably includes parallel side members 28, crosstie 31 and diagonal cross braces 29 and 30 running between and secured to side members 28. Axles 25a and 26a, on which the rear wheels 25 and 26 rotate, are secured to the crosstie 31.

The caster 27 is provided with a yoke 32 to which stud shaft 33 is welded. Such stud shaft is journaled in a suitable bearing 34 which is secured by bolting or welding to U-shaped bracket 35.

The elevator-conveyor mechanism 24 includes an upwardly and rearwardly inclined frame 36, preferably having angularly shaped side members 37 and 38 which are best illustrated in Figs. 1 and 4.

Bars 39, secured to the vertical flanges of the side members 37 and 38 by welding or other suitable means, carry guides 40 and 41 which preferably are made of wood and prevent escape of bales from the conveyor while being elevated. Floor boards 42 and 43, whose function presently will be mentioned, are carried by the horizontal flanges of the side members 37 and 38, respectively.

The elevator-conveyor mechanism 24 comprises a pair of link belt steel chains 44 and 45, and extended between and secured to these chains are crossbars 46 which carry the bales as they are elevated. Referring to Fig. 4, each of the crossbars 46 has welded thereto and extending at right angles therefrom a set of spaced-apart tines 47. I have shown only two tines 47 fixedly secured to each of the crossbars 46; however, any number may be employed, the number of tines employed being dependent upon the size and other characteristics of the bales to be loaded.

Chains 44 and 45 are arranged to run over lower and upper pairs of sprocket wheels 47 and 48, respectively. The upper sprocket wheels 48 are mounted on a shaft 49 journaled in bearings, preferably of the anti-friction type, carried by the upper end portions of the conveyor frame 36, and the lower sprocket wheels 47 are mounted on a shaft 50 journaled in bearings, also preferably of the anti-friction type, carried by the lower end portions of the conveyor frame.

At its upper end, the conveyor frame 36 is supported by upwardly extending members 51 of the main frame 23. At their lower ends, the members 51 are welded to parallel side members 28. At their upper ends, the members 51 are bolted to gusset plate 52 which is welded to the upper end portions of the side members 37 and 38. The free ends of the side members 28 of the main frame 23 are bolted to the side members 37 and 38 of the conveyor frame 36, as is best illustrated in Fig. 1, and caster-carrying bracket 35 is also bolted to the side members 37 and 38 intermediate the ends thereof. Therefore, the entire elevator-conveyor mechanism easily can be demounted from the main frame and the caster-carrying bracket can be demounted from the conveyor frame to facilitate shipment or storage.

The previously mentioned floor boards 42 and 43 provide support for the upper stretches of chains 44 and 45 intermediate the upper sprockets 48 and the lower sprockets 47.

Adjustment of slack in the chains 44 and 45 is accomplished by take-up mechanisms designated in their entirety by the numeral 53 and located adjacent the lower portions of the side members 37 and 38. Other forms of take-up mechanism may be employed.

Although a take-up mechanism is provided at each end of the shaft 50, it is deemed sufficient to describe only one in detail. Referring to Fig. 1, the take-up mechanism 53 includes channel member 54 which is secured to the lower end portion of side member 38 by bolting or other suitable means, and acts as an extension of said side member. Block 55 is carried by said channel member and has welded or otherwise secured thereto a fixed nut 56 and also has an aperture through which the threaded member 57 is extended. The end of the threaded member is adapted to engage the housing of the bearing of the lower shaft 50 and hold it in a desired position. Therefore, by turning the threaded member, the lower shaft can be moved, thereby taking up slack in the chains 44 and 45.

At the upper or discharge end of the elevator-conveyor mechanism, platform 60 is provided to receive the bales from the conveyor. Platform 60, from which the bales easily may be removed and placed on the truck, is secured at one end to the gusset plate 52 and its other end is supported by diagonal braces 61. Platform 60 comprises a floor 62 and a rail 63 having a curved portion adjacent its rear end to guide the bales toward the truck. See Fig. 6.

Power to drive the elevator-conveyor is obtained from the rear wheel 26, which is best depicted in Fig. 1. The drive mechanism includes a lower sheave 64, which suitably is mounted on the inner side of the rear wheel 26, an upper sheave 65 of smaller diameter than the lower sheave and carried by the shaft 49, and a V-belt 66 trained on said sheaves. The V-belt 66 is twisted to obtain proper rotation of the upper shaft.

To assure transmission of power, proper frictional engagement of the V-belt 66 with the sheaves 64 and 65 is accomplished by take-up 67 which comprises a sheave 68 upon which the V-belt is trained, and sheave-carrying bar 69 whose end opposite to the sheave 68 is pivotally mounted to the side member 38.

Spring 70, having one of its ends secured to a bracket 71 carried by side member 38 and its other end secured to extension rod 72, the free end of which is secured to the sheave-carrying bar 69, is provided so that a tensional force is transmitted to the sheave-carrying bracket 69 to assure traction of the V-belt 66 on the sheaves 64 and 65, thereby causing the upper shaft to rotate which in turn will operate the conveyor.

Clutch mechanism 73, carried by the upper shaft 49, is provided to disengage the driving mechanism from the shaft 49 when the loader is moved backwards, thereby preventing reverse movement of the elevator-conveyor.

Referring to Fig. 2, which best illustrates the construction of the clutch mechanism 73, the shaft 49 is extended outwardly beyond the side member 38 and is journaled in bearings 74 and 75, preferably of the anti-friction type. The bearing 74 is carried by the gusset plate 52 and the bearing 75 is carried by U-shaped bracket 76 which is secured to gusset plate 52 by bolts 76' and associated cooperating nuts 76a. The clutch comprises a stationary half 77 mounted on and secured to shaft 49 by the pin 78, and a sliding half 79 formed integral with a hub of the sheave 65. Such halves are provided with cooperating spiral jaws 80. The sliding half may assume two positions, a normal position as depicted in full lines, and a clutch disengaging position shown in dotted lines in Fig. 2. Spring 81 is provided to urge the sliding half into its normal position. Washer 82 provides a bearing surface for one end of the spring 81, the other end of which is retained by the bracket 76. Whenever the bale loader is moved backwards, the V-belt drive will operate in reverse. Because of their spiral shape, reverse movement of the sheave 65 will cause the jaws 80 to disengage and force the sliding half into the dotted line position. The spring 81 will urge the sliding half into its normal position when the bale loader is moved forward.

The forward or pick-up end of the elevator-conveyor is located opposite the cab of the truck and in full view of the driver so that he easily may guide the loader to pick up bales of farm produce which previously have been dropped in and lengthwise of rows on the ground by a baling machine.

Rollers 83 and 84 are mounted on shafts 49 and 50, respectively. Such rollers are of slightly smaller diameter than the sprockets 47 and 48, thereby allowing the crossbars 46 to pass around them. While passing around the roller 84, the tines 47 of a crossbar 46 will engage the lower portions of the near-end surface of a bale and will lift the near end of the bale and place it upon the roller 84 whereupon the roller, in cooperation with succeeding tine-carrying crossbars which engage the underside of the bale to urge it forward, will move the bale off the ground to the elevator-conveyor. A bale is carried by at least two crossbars 46. The forward crossbar will pass around the roller 83 and thereupon the bale will be supported by the roller 83 and will be urged forward by the rear crossbar until it is discharged from the elevator-conveyor to the platform 60.

A forward connecting arm 85 and a rear connecting arm 86 provide a non-rigid attachment of the loader to a truck to permit vertical movement of the loader independent of the movement of the truck which, in cooperation with skids 58 and 59 mounted on the lower forward end of the elevator-conveyor, will adapt the loader to uneven farm land over which it will travel, whereby the tines 47, while passing around the roller 84, will assume their proper positions for engaging the lower portions of the front end wall of a bale irrespective of the uneven farm land. The skids 58 and 59 normally are disposed slightly above the ground and only take over when the caster wheel 27 runs into a depression.

The forward connecting arm 85 and the rear connecting arm 86 are best illustrated in Figs. 5, 7 and 8. Bracket 87 is carried by side member 37, and bracket 88 is carried by support member 51, and brackets 89 and 90, which are similar to brackets 87 and 88, are carried by the truck body 21. Each end of the arm 85 is provided with an aperture and each of the brackets 87 and 89 is provided with a plurality of apertures 93 through which bolts 91 and 91a may be placed pivotally to connect each end of the arm to the respective brackets. Arm 86 and brackets 88 and 90 are constructed similarly to the arm 85 and the brackets 87 and 89 with the exception that a web 92 is provided to reinforce the arm 85.

Truck bodies or wagons vary in height and, therefore, the plurality of apertures in the brackets, through which bolts 91 and 91a selectively may be placed, provide for adjustment of the arms to suit the height of the vehicle body.

To detach the loader from the truck, it is only necessary to remove bolts 91a, thereby disengaging the arms 85 and 86 from the brackets 89 and 90 on the truck. The truck can then be used for other purposes.

The operation of the loader is as follows: The loader being attached to a truck, as hereinbefore described, is moved toward a bale 94 by the movement of the truck. The driver of the truck so guides it that the skids 58 and 59 move alongside the bale on opposite sides thereof. The tines 47 of a first series, i. e., the tines carried by one of the crossbars 46, while traveling through those curved portions of their paths which extend partially around the roller 84, engage the adjacent end of the bale near the bottom of the bale, the engagement of the tines 47 of such first series with the bale at points close to but definitely spaced from the ground, regardless of irregularities in the terrain, being assured by the hereinbefore mentioned cooperation of the skids 58 and 59, the caster 27 and the connections comprising the arms 85 and 86 which permit independent vertical movements between the loader and the truck while requiring the loader to travel with the truck. As the tines 47 of such first series continue to move around the roller 84, they lift from the ground that end of the bale which they have engaged, and the roller 84 moves into the angle between the ground and the bottom of the bale. As the tines 47 of said first series continue their movement they disengage themselves from the bale, permitting the lifted end of the bale to drop upon the roller 84. With the roller 84 progressing farther into the angle between the bale and the ground, the tines 47 of a second series and the tines 47 of a third series successively strike into the bottom of the bale to carry it upwardly on the elevator-conveyor while resting on two of the tine-carrying crossbars 46.

When the leading one of the two crossbars 46 on which the bale has reposed passes around the upper roller 83, the bale will be supported by the roller 83 and will be urged rearwardly of the loader by the tines of the other crossbar until it is discharged from the elevator-conveyor to the platform 60.

The platform 60 is disposed at a higher level than is the floor of the truck body. The rail 63 guides the bales toward the side of platform 60 lying nearest the truck; whereupon the bales may be removed from the platform and stacked in the truck by men equipped with hand hooks.

When the truck has been sufficiently loaded, the loader is detached by removing the bolts 91a, thereby disengaging the arms 85 and 86 from the brackets 89 and 90 on the truck. The truck then may be used to deliver the bales and the loader may be left in the field for the next load or the loader successively may be attached to other trucks.

Having thus illustrated and described a preferred embodiment of my invention, what I claim as new and desire to secure by Letters Patent of the United States is:

1. In a bale loader to accompany a truck or wagon, in combination, an elevator-conveyor mechanism comprising a conveyor frame, a pair of link belt chains in spaced relationship to each other and trained on sprockets mounted on an upper shaft and a lower shaft journaled in bearings carried by said frame, crossbars secured to and extending between said chains, a plurality of spaced-apart tines carried by and projecting at right angles from each of said crossbars, a wedging roller carried by said lower shaft, said roller being only slightly less in diameter than the sprockets carried by the shaft on which it rolls, said tine-carrying crossbars traveling in a path extending in immediate proximity to and partially around said roller, and means for supporting the forward end of said elevator-conveyor mechanism above and relatively close to the ground, whereby, during movement of the loader relatively to a bale, the tines carried by a first one of said crossbars will penetrate the vertical surface of the near end of the bale at the lower portion thereof and partially raise said near end of the bale so that said roller may pass therebeneath and then disengage themselves from the bale to permit it to drop onto said roller, whereupon said roller, further raising the bale by moving into the angle between the bale and the ground, will enable the tines carried by a second crossbar and a third crossbar to penetrate the bottom of the bale for the purpose of carrying the bale upwardly of the elevator-conveyor mechanism.

2. In a bale loader for attachment to and accompaniment of a truck or wagon while capable of vertical movements independently thereof, an elevator-conveyor frame downwardly and forwardly inclined, a conveyor belt operably supported by said frame, spaced-apart sets of tines carried by and projecting away from the belt, the tines of each set being spaced apart transversely of the belt, means for causing the belt to operate when the loader moves forwardly, and means for supporting the forward end of said frame relatively close to the ground and at a substantially uniform distance thereabove irrespective of irregularities of terrain, said last-mentioned means comprising a caster and skid means, said caster being carried by the forward part of the frame and located behind the lowermost portion thereof and normally engaging the ground, said skid means being carried by the forward portion of the frame and extending forwardly beyond the lowermost portion thereof and normally lying slightly above the ground, said frame being rigid intermediate the caster and the skid means and being supported above the ground by the skid means when thus not supported by the caster independently of the skid means.

EDWARD F. SIMS.

REFERENCES CITED

The following references are of record in the file of this patent:

UNITED STATES PATENTS

| Number | Name | Date |
|---|---|---|
| 1,570,256 | Hunt | Jan. 19, 1926 |
| 1,853,253 | Bennett | Aug. 3, 1943 |
| 2,038,809 | Tallman et al. | Apr. 28, 1936 |
| 2,325,433 | Sprinkle | July 27, 1943 |
| 2,325,704 | Passa | Aug. 3, 1943 |
| 2,397,570 | Smoker | Apr. 2, 1946 |
| 2,402,465 | Templeton | June 18, 1946 |
| 2,408,863 | Lisota | Oct. 8, 1946 |